(No Model.)
S. ALBRIGHT.
EARTH AUGER.
No. 357,544. Patented Feb. 8, 1887.
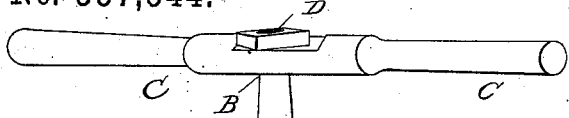
Fig. 1.
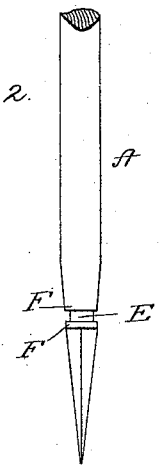
Fig. 2.
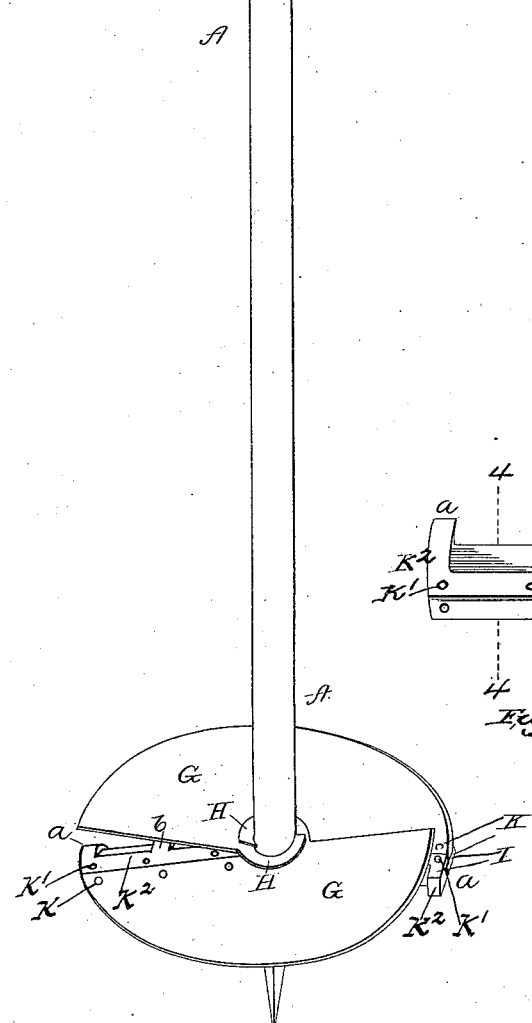
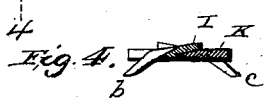
Fig. 3.
Fig. 4.
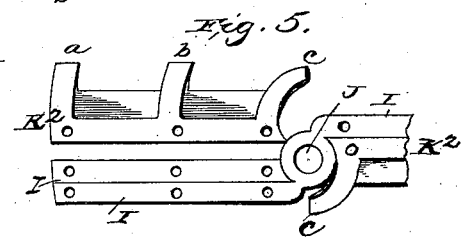
Fig. 5.
Attest:
Elliott P. Hough.
Henry Gardner Jr.
Inventor:
Samuel Albright,
By Chas. J. Gooch
Attorney.

UNITED STATES PATENT OFFICE.

SAMUEL ALBRIGHT, OF NEVADA, MISSOURI, ASSIGNOR TO WILLIAM ALBRIGHT, OF SAME PLACE.

EARTH-AUGER.

SPECIFICATION forming part of Letters Patent No. 357,544, dated February 8, 1887.

Application filed February 9, 1886. Serial No. 191,326. (No model.)

*To all whom it may concern:*

Be it known that I, SAMUEL ALBRIGHT, a citizen of the United States of America, residing at Nevada, in the county of Vernon and State of Missouri, have invented certain new and useful Improvements in Earth-Augers; and I do hereby declare the following to be a full, clear, and exact description of the invention, such as will enable others skilled in the art to which it appertains to make and use the same, reference being had to the accompanying drawings, and to letters or figures of reference, marked thereon, which form a part of this specification.

This invention relates to improvements in earth-augers.

The invention consists, essentially, of a stem or handle, a suitable boring-point, a bar or plate secured to the lower portion of said handle, a pair of disk-shaped dirt receiving and carrying blades removably bolted or riveted to said bar, and a pair of knives removably bolted to said bar, and having on their free edges a series of inwardly and downwardly curved and bevel-shaped teeth, all as and for the purpose hereinafter described.

In the accompanying drawings, Figure 1 represents a perspective view of my improved earth-auger. Fig. 2 represents a portion of the stem or handle. Fig. 3 is a detail view of the toothed-bar attachment. Fig. 4 represents a transverse section on the line 4 4 of Fig. 3. Fig. 5 represents a detail view showing a portion of the toothed-bar attachment with one of the toothed bars detached therefrom.

A represents the stem or handle, which at its upper end is provided with a shouldered portion, B, to receive the hand-grasp C, by which the auger is operated, and a screw-thread, D, to receive a nut for the purpose of securing said hand-grasp in position.

E represents a circumferential recess, guarded by flanges or shoulders F, to receive and retain a straight metal bar and the thereto-attached cutters or knives, feeders, and disk-shaped earth receivers and conveyers, to be presently described.

G G represent the disk-shaped plates which receive the loosened earth. These are of angular or curved shape, as shown, so as to extend eccentrically from the stem, and thus each present two angularly-extending edges to permit of the auger readily passing down through the loosened earth.

H represents a curved or hook-shaped portion extending inwardly from the inner edge of each disk and on the upper side thereof, which hooks embrace and grip the stem, and thus strengthen said disks and assist in maintaining them rigidly in position.

I represents a plate or bar having a central orifice, J, to permit of the passage therethrough of the stem A. The edges of the plate I, surrounding this orifice, rest within the circumferential recess E in the lower portion of the stem, the flanges or shoulders F serving to retain said plate in position upon the stem and prevent its movement thereon. This plate or bar I is of sufficient length and of a shape to extend transversely across a portion of the face of each disk, said disks being removably bolted or otherwise connected, with capability of ready removal therefrom to said bar, as shown at K. To the inner free edges of the bar I, and consequently on the opposite edges thereof, are removably connected, by bolts K', knives or cutters K², each having downwardly-extending and inwardly-curved bevel-shaped teeth *a b c*. The bar, when in position, entirely extends across the disks, and the outer teeth, *a a*, extend downwardly and inwardly in a curved direction from the respective ends of said bar. The inner pair of teeth, *c c*, are of greater inward curvature than the remaining teeth, and each extends horizontally across the pointed lower end of the stem, thereby insuring the perfect breaking and cutting of the earth at that point and preventing the clogging of the point of the auger. These teeth extend some distance below the disks and cut ahead of them, and thus effectively break up and loosen the earth in readiness for the operation thereon of the cutting-knives K², and by reason of their inwardly-curved shape operate to draw the auger and cutters down into the earth as the auger is rotated. The feeding or cutting teeth *a a* on the outer end of the bar I insures the making of a clean cut, and in practice is found to result in leaving the hole made by the auger perfectly smooth.

The knives, with their feeding-teeth and the disks, can be readily and quickly removed by withdrawing the bolts from the bar I, and sharpened and replaced in position, as desired.

Having thus described my invention, what I claim is—

1. An earth-auger having a bar provided with knives having a series of inwardly and downwardly curved teeth and rigidly connected to the stem or handle, and curved disks removably attached to said cutter-bar, as set forth.

2. The earth-auger herein shown and described, consisting of a stem or handle, a bar or plate having bearing upon and connected to said stem, curved disks removably connected to said bar, and knives removably connected to the opposite free edges of said bar and having a series of inwardly and downwardly curved teeth, as and for the purpose set forth.

3. The earth-auger herein described, consisting of a stem or handle, a plate or bar attached to and having a central bearing on said stem, and provided with removable knives having a series of inwardly and downwardly extending curved and bevel-shaped teeth, the outer teeth extending inwardly from the end of said bar and the outer edge of the cutters, while the central teeth curve around the lower end of the stem, and curved disks removably attached to said plate or bar, as set forth.

4. The earth-auger herein described, consisting of a stem or handle having at its lower portion a shouldered recess, a pair of disks, a plate or bar having a central slot or opening to adapt said plate to fit and be secured within the shouldered recess in the stem or handle, bolts for securing the removable connection of said disks and bars together on the opposite sides or edges thereof, and knives, each having inwardly and downwardly curved and beveled teeth and removably bolted to said plate or bar, substantially as and for the purpose set forth.

5. An earth feeding and breaking attachment for connection to earth-augers, consisting of a bar having a central orifice for connection to the stem or handle of the auger, knives or cutters removably connected to said bar and having on their outer edges a series of inwardly and downwardly curved teeth, the central pair of teeth curving around the central stem-connecting orifice in said bar, as and for the purpose set forth.

6. An earth-auger having a stem or handle and a pair of curved disks, each having a hook-shaped portion extending from its inner edge to embrace the stem and clamp said cutters thereto, as set forth.

In testimony whereof I affix my signature in presence of two witnesses.

SAMUEL ALBRIGHT.

Witnesses:
CHARLES E. BAKER,
JOHN A. HAUSER.